United States Patent [19]

Cowdin

[11] 3,882,741
[45] May 13, 1975

[54] SUPPORT- AND -CUTTING-TOOL ASSEMBLY

[76] Inventor: Lloyd D. Cowdin, 563 Pala Ave., San Leandro, Calif. 94577

[22] Filed: Apr. 25, 1973

[21] Appl. No.: 354,347

[52] U.S. Cl. ................................................. 82/35
[51] Int. Cl. .......................................... B23b 29/00
[58] Field of Search ........................... 82/35, 36, 37

[56] References Cited
UNITED STATES PATENTS

| 937,886 | 10/1909 | Stevenson | 82/35 |
|---|---|---|---|
| 1,240,221 | 9/1917 | Katzmarek | 82/35 |
| 2,323,834 | 7/1943 | Moller | 82/35 |
| 3,581,612 | 6/1971 | Jackman | 82/35 |

FOREIGN PATENTS OR APPLICATIONS

| 421,694 | 5/1947 | Italy | 82/35 |
|---|---|---|---|
| 1,032,807 | 4/1953 | France | 82/35 |
| 13,846 | 11/1885 | United Kingdom | 82/35 |

Primary Examiner—Harrison L. Hinson
Attorney, Agent, or Firm—Joseph B. Gardner; Theodore J. Bielen, Jr.; Richard E. Peterson

[57] ABSTRACT

A support- and -cutting-tool assembly for use with a lathe for machining elongated flexible rods which, in their initial form, may be cylindrical or polygonal in cross section. The tool assembly includes a carrier adapted to be mounted upon the carriage of a lathe so as to be reciprocated axially thereby toward and away from the collet of the lathe. The carrier is disposed transversely with respect to the path of movement and has a large central opening within which is removably mounted a support block having a passage therethrough alignable with the collet and through which the elongated workpiece projects when gripped by the collet. A cutting bit mounted upon the carrier at the trailing end of the passage is engageable with the workpiece to remove stock therefrom as the workpiece is rotatably driven by the collet and as the carrier and carriage upon which it is mounted are displaced toward the collet. Thus, even though the workpiece is flexible and tends to bow or whip, it may be supported at one end only by the collet and is nevertheless fixedly constrained by the support block during the machining operation at the exact location at which the cutting bit is removing stock therefrom.

6 Claims, 7 Drawing Figures

SUPPORT- AND -CUTTING-TOOL ASSEMBLY

This invention relates to machine tools and, more particularly, to a support- and -cutting-tool assembly adapted for use with a lathe, drill press, and similar mechanisms for machining elongated shafts or rods which may be of small cross section and therefore relatively flexible.

In using a lathe for machining workpieces of various types, such a workpiece is gripped adjacent one end thereof by the collet-equipped head of the lathe, and it is usually held adjacent its other end by a live support or end center support provided by the tail stock of the lathe. The workpiece is rotatably driven by the collet-equipped head of the lathe, and a cutting tool secured to the reciprocable carriage of the lathe is moved thereby along the workpiece to engage the same and cut stock therefrom. With the usual relatively large or stiff workpiece, no particular problems arise in operations of this type, but with long thin shafts or rods, it may not be possible to support the same at the end thereof adjacent the tail stock. Further, when such rods are flexible they tend to whip or bow during the machining operation, thereby negating the possibility of a precision finish being formed along the length thereof.

In view of the foregoing, an object of the present invention is to provide an improved support- and -cutting-tool assembly for use with a lathe or similar mechanism for machining elongated workpieces to a precision finish all along the length thereof irrespective of whether such workpieces tend to bow or flex during the machining operation.

Further objects, among others, of the present invention are in the provision of an improved tool assembly of the character described in which the workpiece is required to be supported only adjacent one end thereof such as by the collet of a lathe which is effective to rotate the workpiece as well as support the same in cantilever fashion; in which the tool assembly is quickly and easily adjusted to accommodate workpieces of various cross sectional dimensions and configurations incuding both cylindrical and polygonal cross sections; in which the entire travel of the carriage of a lathe or similar machine may be used for the cutting operation, thereby obviating stroke limits; in which the workpiece is firmly and fixedly supported by the tool assembly adjacent the precise location at which a cutting bit carried by the assembly engages the workpiece to remove stock therefrom; in which the machining operation is performed along the trailing side of the tool assembly relative to the direction of movement thereof during a machining operation; and in which both coarse and fine adjustments are provided for selecting and establishing the depth of cut to be performed by the tool assembly.

Additional objects and advantages of the invention, especially as concerns particular features and characteristics thereof, will become apparent as the specification continues.

Embodiments of the invention are illustrated in the accompanying drawings, in which.

Figure 1:
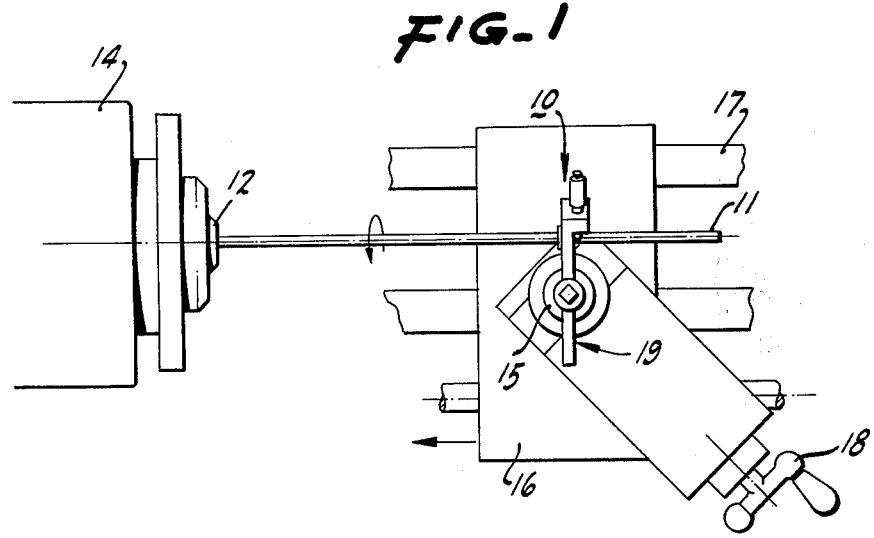
FIG. 1 is a broken top plan view illustrating the tool assembly in operating association with a lathe and with a workpiece held and rotatably driven by the lathe.
Figure 2:
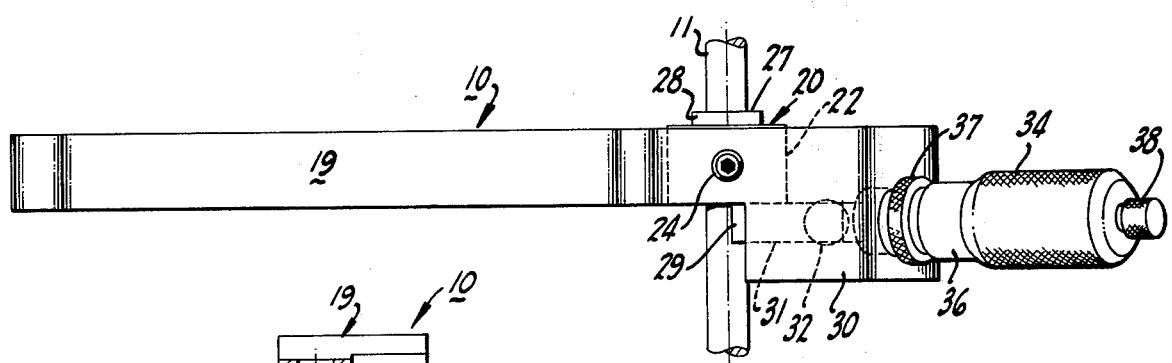
FIG. 2 is a top plan view of the tool assembly removed from the lathe.

As previously explained, the support- and -cutting-tool assembly of the present invention is adapted for use in machining elongated stock and like workpieces, and in FIG. 1, the tool assembly 10 is shown in operative association with a workpiece 11 supported at one end thereof in the chuck or collet 12 of a lathe 14. The collet 12 defines a cantilever support for the workpiece 11, and it rotates the same in the direction of the arrow relative to the tool assembly 10 to enable the tool to remove material from the workpiece in a machining operation. The assembly 10 is mounted upon the tool post 15 of the carriage 16 of the lathe which is supported for reciprocable axial displacements along a stationary table or platform 17 constituting a part of the lathe. The tool post 15 is positionally adjustable relative to the workpiece 11 by means of a handle-equipped adjustment mechanism 18.

As respects the present invention, the lathe 14 and all of the components associated therewith may be completely conventional and per se form no part of the present invention. Accordingly, further details respecting the lathe and its function are not germane to the present invention and will not be included in this description. Generally stated, the carriage 16 is driven along a predetermined path axially aligned with the collet 12 which is disposed adjacent one end of such path. As the carriage 16 is moved, the collet 12 rotates the workpiece 11 and as a result of the combined movements, the workpiece 11 is machined to the desired finish therealong. Ordinarily, the carriage 16 will be located adjacent the outer free end of the workpiece 11 to initiate the machining operation, and the carriage will be displaced toward the collet 12 (as indicated by the directional arrow in FIG. 1) so that the trailing portion of the workpiece will be machined to the desired finish while that portion of the workpiece intermediate the tool assembly 10 and collet 12 will be unfinished.

The lathe 14 typifies a variety of machines with which the invention has utility, and another example thereof is a drill press. In any case, the machine employed will be effective to produce relative rotational movement between the workpiece and tool assembly and also axial displacements between the workpiece and tool assembly, both of which movements are required to effect a machining operation along the length of the workpiece.

The workpiece 11 may take a variety of forms but in the usual instance, it will be relatively thin elongated stock that tends to bow or flex during the machining operation. Such stock may constitute a great variety of materials including metals, synthetic plastics, wood, and substantially any other material upon which a machining operation may be performed. Further, the workpiece 11 may have an initial form that is either round or polygonal (square for example), and in either instance the tool assembly 10 will be adapted to conform to and support the particular workpiece then being machined, as will be described in detail hereinafter.

The tool assembly 10 includes a carrier 19 adapted to be secured to the carriage 16 and tool post 15 thereof, as previously described, and to be displaced by the carriage axially along a path having the collet 12 located adjacent one end thereof. The carrier 19 is in the form of an arm or bracket ordinarily assuming a transverse orientation with respect to the path of movement thereof, as shown in FIG. 1. The carrier is removably secured to the tool post 15, and it has an axially disposed passage therethrough alignable with the collet 12 and dimensioned to slidably receive and pass the workpiece 11 therethrough when gripped by the collet in a manner enabling the workpiece to be rotatably driven thereby. In the particular embodiment of the invention shown in FIGS. 1 through 4, the carrier 19 is provided with a support block 20 defining therethrough the passage 21 that slidably receives the workpiece 11. The support block 20 is removably mounted within a relatively large opening 22 provided therefor in the carrier 19. As respects such removably mounting, the carrier 19 is provided with a set screw 24 adapted to bear against the support block 20 to constrain the same within the opening 22, as shown best in FIG. 4.

Figure 4:
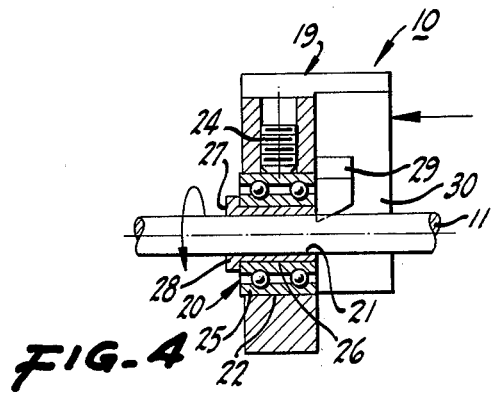
FIG. 4 is a vertical sectional view taken along the line 4—4 of FIG. 3.
Figure 3:
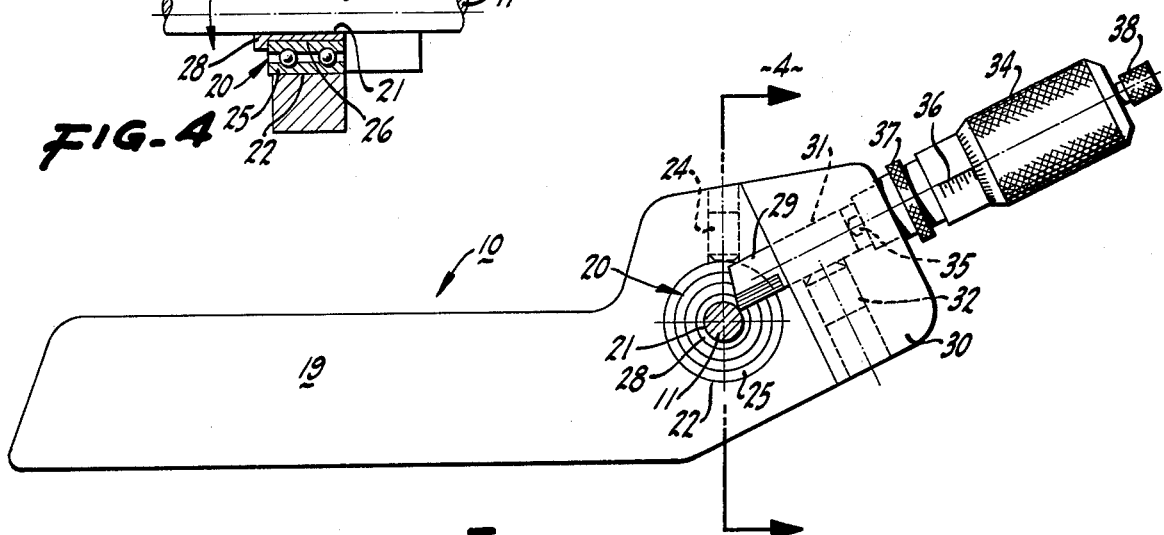
FIG. 3 is a side view in elevation of the tool assembly.

The removably mounting of the support block 20 within the opening 22 enables a plurality of support blocks with passages 21 of various sizes to be interchangeably mounted within the opening 22 to accommodate variously sized workpieces 11. That is to say, and as will become evident hereinafter, the support block 20 is intended to constrain the workpiece 11 against translational displacements in all directions transverse to the axis of the workpiece as material is removed therefrom in a machining operation so that the workpiece will be very accurately machined. Accordingly, it is necessary that the workpiece be tightly or snugly contrained by the perimetric walls of the passage 21 which, therefore, dictates the requirement that the passage 21 in each support block 20 be specifically dimensioned to accommodate the size and cross sectional configuration of the workpiece with which it is to be associated, as shown in FIG. 4.

The particular support block 20 in the embodiment of the invention illustrated in FIGS. 1 through 4 includes bearing structure 25 that may be permanently or semipermanently mounted within the opening 22 in the carrier, and the bearing structure is provided with a central opening 26 therethrough within which a bushing 27 is removably mounted and defines the aforementioned passage 21 through which the workpiece 11 extends. The bushing 27 is in the nature of a hollow tube or sleeve insertable axially into the central opening 26 in the bearing structure, and the bushing at one end thereof is equipped with a laterally extending flange 28 adapted to overlie a portion of the bearing structure 25 so as to constrain the bushing against axial displacements relative to the bearing structure in one direction. Thus, the carrier 19 can move toward the left as shown by the directional arrows in FIGS. 1 and 4 and slidably passes the workpiece 11 through the passage 21 in the bushing, but axial displacement of the carrier in the opposite direction may result in removal of the bushing from the opening 26.

The tool assembly 10 further includes a cutting bit 29 removably mounted upon the carrier and adjustably positionable with respect thereto and, more particularly, with respect to the passage 21 and workpiece 11 located therein. The carrier 19 has en enlargement or boss 30 along the trailing side thereof, and such boss is provided with a bore 31 therethrough dimensioned to receive the cutting bit 29 and to permit adjustments of the bit along its length and along the length of the bore. The cutting bit 29 may be secured in any position of adjustment thereof by means of set screw 32 mounted within a threaded opening provided therefor in the boss 30. The cutting bit 29 has respects its structural characteristics and function may be substantially conventional, and it has a sharpened end adapted to cuttingly engage the workpiece 11 to remove stock therefrom, as shown best in FIG. 3.

The set screw 32 forms a part of adjusting means comprised by the tool assembly 10 for varying the relative positions of the cutting bit 29 and passage 21 to establish the depth of cut and amount of material machined from any workpiece 11 extending through the passage 21. The set screw 32 by itself generally constitutes locking means for securing the bit 29 in selected positions of adjustment thereof which may be effected by coarse adjustment means or fine adjustment means. That is to say, the location of the bit 29 within the opening or bore 31 therefor may be established manually simply by displacing the bit in any manner (as in the case of the embodiment of the invention illustrated in FIGS. 5 through 7) along the opening 31 and then securing the bit at the selected location by tightening the set screw 32 thereagainst. On the other hand, the bit 29 may be more accurately located with respect to the passage 21 in which case the aforementioned adjustment means will include fine adjustment structure positionally related to the carrier 19 and engageable with either the bit 29 or support block 20 to adjust the relative positions thereof.

In the embodiment of the invention shown in FIGS. 1 through 4 the fine adjustment structure comprises a micrometer 34 mounted upon the carrier 19 in cooperative engagement with the bit 29 to establish accurately the position thereof relative to the passage 21 and any workpiece 11 extending therethrough. In the form shown, the micrometer structure 34 is fixedly related to the carriage 19 and has an adjustable plunger 35 that bears against an end of the bit 29 and is effective to displace the bit toward the passage 21 but is ineffective to displace the bit in the opposite direction. The micrometer structure 34 is completely conventional and includes the usual scale 36, locknut assembly 37, and override safety 38 to accommodate slippage in the event that displacement of the bit 29 is constrained when adjustment of the micrometer structure is attempted. Any conventional micrometer structure may be used, and an example thereof is the product of The L S Starrett Company.

Figure 5:
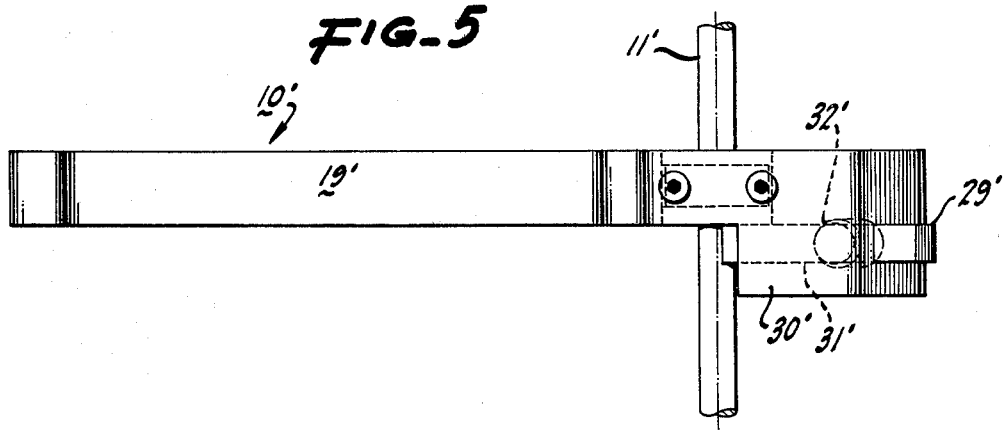
FIG. 5 is a top plan view of a modified tool assembly.
Figure 6:
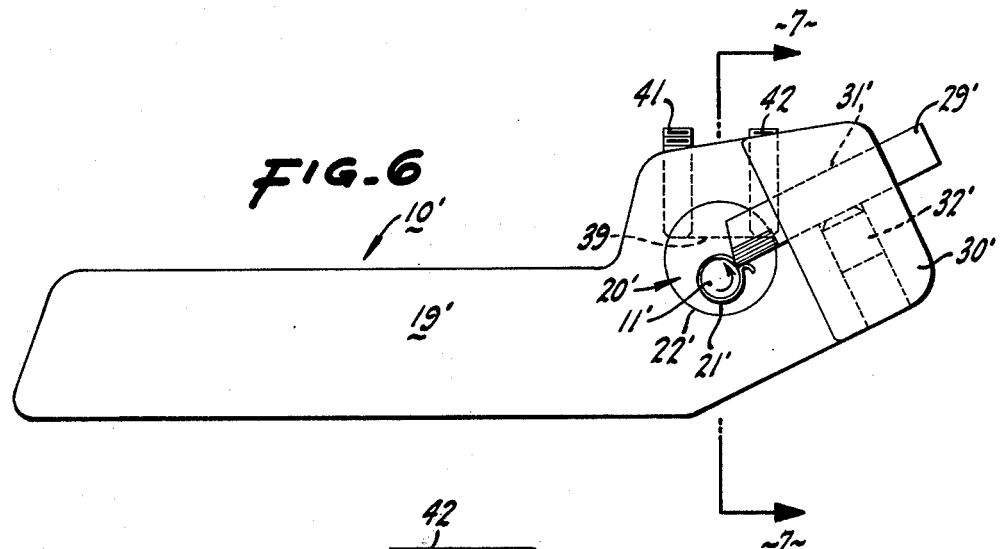
FIG. 6 is a side view in elevation thereof.
Figure 7:
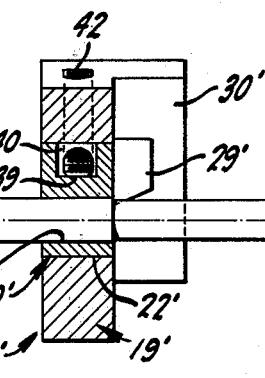
FIG. 7 is a vertical sectional view taken along the line 7—7 of FIG. 6.

A modified form of the invention is illustrated in FIGS. 5 through 7, and it is somewhat simplified over the embodiment heretofore described although the function of the simplified assembly is less refined as respects the rotational accommodation of the workpiece. The modified assembly is generally similar to the assembly heretofore described, and in view of the general correspondence of elements, the primed form of the same numerals are used to identify respectively corresponding elements. Thus, the tool assembly 10' includes a carrier 19' of substantially the same general configuration of the carrier 19 heretofore considered. It therefore has a large opening 22' in which a support block 20' is removably position, and such support block has a passage 21' passing a workpiece 11' therethrough.

The modified tool assembly 10' includes a fine adjustment means, but whereas the fine adjustment means of the assembly 10 functioned in cooperative association with the bit 29, the adjustment means in the tool assembly 10' is in operative association with the support block 20'. In this respect, the passage 21' through the bearing block is eccentrically disposed with respect to the center of the opening 22' within which the bearing block is angularly displaceable. The bearing block 20' has a flattened surface portion 39 defined as the inner or base wall of a narrow channel 40 oriented in cordial disposition with respect to the cylindrical support block. A pair of adjusting screws 41 and 42 respectively received within threaded openings therefor in the carrier 19' engage the flat base wall 39 of the support block 20', as shown best in FIG. 6. It will be apparent that gradually tightening one of the screws while loosening the other will cause the support block 20' to be angularly displaced about the center of the opening 22', thereby changing the relative positions of the eccentrically disposed passage 21' (and any workpiece 11' extending therethrough) and cutting bit 29'.

The cutting bit 29' is essentially the same as the bit 29 heretofore described except that is slightly longer and projects outwardly from the bore 31' to enable the same to be finger for adjustment purposes. The bore 31' is located within the boss 30', and a set screw 32' locks the bit in any position of adjustment. Thus, coarse adjustment is afforded for the bit 29'.

The use of either of the tool assemblies 10 and 10', such assembly is secured in position on the equipment with which it is to be associated which, in the environment of FIG. 1, constitutes mounting the tool assembly on the tool post 15 of the lathe 14. Any technique found desirable may be used to align the tool assembly with the chuck or collet 12 as, for example, by using a straight piece of drill rod held at one end by the collet and aligned at its opposite end with the passage 21 through the tool assembly by appropriate manipulation of the various adjustments described including the adjustment mechanism 18 provided by the lathe carriage 16 and tool post 15 supported thereupon. Upon such alignment, the tool assembly 19 is secured in position and is ready for use.

The drill rod is then removed and the workpiece to be machined inserted into the collet 12 which is tightened thereabout so as to support the workpiece in cantilever fashion. The carriage 16 is moved along the table 17 to a position remote from the collet 12, and the outer free end of the workpiece 11 is inserted into the passage 21. The lathe is then set in operation, thereby causing the workpiece 11 to be rotatably driven by the collet 12 and to also cause the carriage 16 to begin translational movement toward the collet. The cutting bit 29 engages the workpiece and removes stock therefrom with the depth of cut being determined by appropriate adjustment of the tool assembly. The machining operation continues until the carriage 16 has been moved throughout its complete path of travel which approximates the entire length of the workpiece 11 except for that small portion thereof which is gripped by the collet 12. Such unfinished end portion of the workpiece can be cut off and discarded or, if desired, the workpiece can be turned end-for-end and the previously gripped end portion of the workpiece machined to the desired finish.

As previously explained, the support block 20 is selected so that the passage 21 is dimensioned to snugly receive the particular workpiece to be machined. In the case of the support block 20 in the embodiment of the invention illustrated in FIGS. 1 through 3, a passage 21 of appropriate diameter and configuration is provided by interchanging one bushing 27 for another having the proper passage. In the case of the embodiment of the invention illustrated in FIGS. 5 through 7, a passage 21' of proper shape and dimensions is provided by interchanging the entire support block 20' for another having the correct passage. The depth of cut in the tool assembly 10 is selected by proper manipulation of the set screw 20 and micrometer 34, and corresponding adjustment is effected in the tool assembly 10' by manipulation of the set screw 32' and cutting bit 29' and/or adjustment of the screws 41 and 42, all as previously explained.

Since the workpiece 11 is rotatably driven, it will be apparent that the support block 20 associated with the tool assembly 10 offers advantage over the support block 20' associated with the tool assembly 10'. That is to say, the bushing 27 is supported for relatively frictionless or free rotation by the bearing structure 25, thereby enabling the support block 20 to be particularly suited for use with workpieces having noncylindrical or polygonal configurations. Noncylindrical workpieces are not readily supported for rotation by the support block 20' unless any such polygonal configuration is symmetrical about a center axis and the passage 21' is dimensioned to describe a circle about the center of the workpiece in contiguous relation with the corner portions thereof.

In all cases the tool assembly firmly supports the workpiece 11 at the precise location at which the cutting edge of the bit engages the workpiece. Therefore, even though there may be some whipping or flexing of the elongated workpiece 11 along the length thereof, there is no transverse movement of the workpiece at the precise point that the bit engages the same, whereby a precision finish is obtained irrespective of the length of the workpiece or the depth or character of the cut performed thereon. Further, it is not necessary to have a live center or other support for the workpiece 11 at the outer end thereof where the workpiece is sufficiently large in diameter to accommodate such a support, and small-diameter workpieces incapable of being supported by such center are nevertheless firmly and rigidly supported by the tool assembly at the precise location of the cut performed by the bit. Thus, the tool assembly is especially useful with very small diameter workpiece which are very flexible and could not heretofore be machined with any degree of accuracy because of their flexibility and because they could not be supported at the outer end thereof.

There is no limitation on stroke length of the tool assembly since it is supported by the carriage of the lathe which travels the entire length of the table 17 supporting the same thereon for reciprocable displacements. Moreover, there is no limit on the size of the workpiece 11 as there is with 3-bearing supports or box tool supports or box tool supports of conventional design used in standard lathes adjacent the tail stock thereof. It may also be noted, as seen best in FIGS. 3 and 6, that the actual cut performed by the bit of the tool assembly is located so that the chips fall away from the work and do not interfere with the machining operation or require periodic removal. Thus, once the tool assembly is adjusted properly and a machining operation is initiated, it is effected accurately without attention from an operator and along the entire length of the workpiece.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is:

1. A support-and-cutting-tool assembly for machining elongated stock and like workpieces, comprising:
   a. carrier shaving an opening therein adapted to be secured to the carriage of a lathe and be displaced thereby along an axially extending path having the collet of such lathe located adjacent one end thereof;
   b. support block removably mounted within said opening and providing a passage of selective sizes to snugly fit the elongated stock being machined, said passage being axially disposed through said support block and alignable with such collet so as to be rotatably driven thereby; said support block being angularly displaceable within said opening about the center thereof and said passage is eccentrically disposed relative to said center;
   c. cutting bit mounted upon said carrier;
   d. and adjustment means for varying the relative positions of said cutting bit and passage to establish the depth of cut and amount of material machined from a workpiece extending through said passage, said adjustment means further including means for accurately adjusting the angular position of said support block relative to said carrier to establish accurately the position of said passage and any workpiece extending therethrough relative to said bit.

2. The tool assembly of claim 1 in which said adjustment means includes fine adjustment structure positionally related to said carrier and engageable with one of said support block and cutting bit to adjust the position thereof relative to the other.

3. The tool assembly of claim 2 in which said support block removably mounted within said opening and providing the aforesaid passage of selective sizes includes a plurality of support blocks with passages of various sizes which are interchangeably mountable within said opening to accommodate variously sized workpieces.

4. The tool assembly of claim 1 in which said cutting bit is removably mounted upon said carrier and is adjustably movable with respect thereto and with respect to said passage, and further comprising locking means for securing said cutting bit selected positions of adjustment and being comprised in the aforesaid adjustment means.

5. The tool assembly of claim 4 in which said cutting bit is disposed along the trailing end of said passage relative to the direction of movement of said carrier during a machining operation.

6. The tool assembly of claim 5 in which said support block removably mounted within said opening and providing the aforesaid passage includes a plurality of support blocks with passages of various sizes which are interchangeably mountable within said opening to accommodate variously sized workpieces.

* * * * *